Aug. 11, 1970        G. K. McAULIFFE ET AL        3,524,169
IMPULSE RESPONSE CORRECTION SYSTEM

Filed June 5, 1967                                7 Sheets-Sheet 2

INVENTORS
GERALD K. McAULIFFE
DAVID M. MOTLEY
BY
Howard A. Silber
ATTORNEY

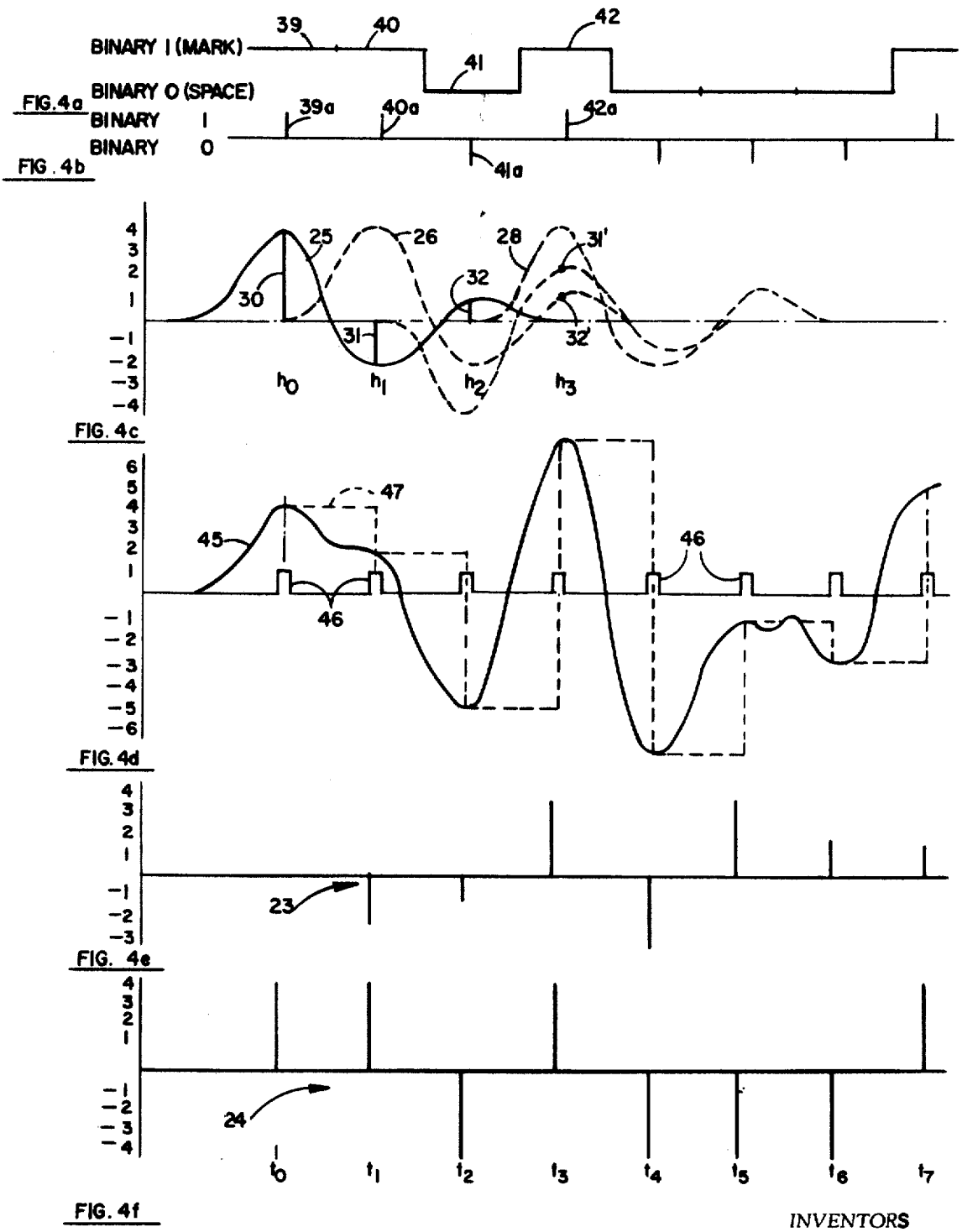

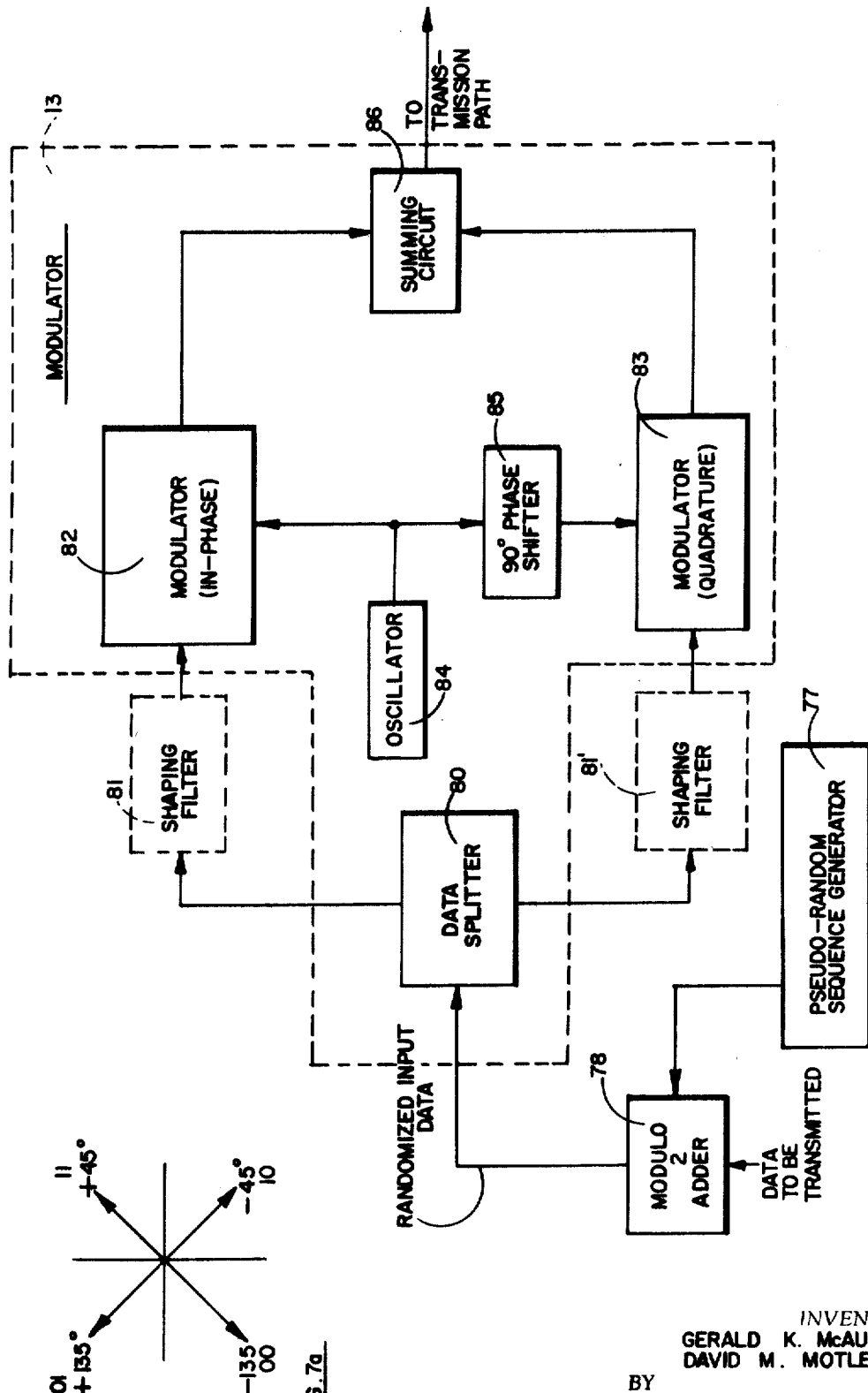

Aug. 11, 1970   G. K. McAULIFFE ET AL   3,524,169
IMPULSE RESPONSE CORRECTION SYSTEM
Filed June 5, 1967   7 Sheets-Sheet 7

INVENTORS
GERALD K. McAULIFFE
DAVID M. MOTLEY
BY
Howard A. Silber
ATTORNEY 3,524,169
IMPULSE RESPONSE CORRECTION SYSTEM
Gerald K. McAuliffe, Orange, and David M. Motley, Santa Ana, Calif., assignors to North American Rockwell Corporation, a corporation of Delaware
Filed June 5, 1967, Ser. No. 643,517
Int. Cl. G06f 11/00
U.S. Cl. 340—172.5                    16 Claims

ABSTRACT OF THE DISCLOSURE

A device which corrects distortion of digital data sent over a transmission channel. The apparatus stores previously received data bits and cross-correlates these with the signal being received, thereby obtaining the impulse response of the transmission channel. Cross-correlation is achieved by digitally multiplying each of the $n$ most recently received data bits by the sampled received signal and integrating the products over time. A correction signal then is derived by digitally multiplying the measured impulse response values by the stored data and summing the products. Another embodiment of the invention also compensates for cross-channel distortion arising in a quadrature modulation system.

BACKGROUND OF THE INVENTION

Field of the invention

This invention relates to a system for correcting distortion of digital data sent over a transmission channel. More particularly, the invention relates to a digital, impulse response correction system which adaptively determines the impulse response of the transmission channel and derives therefrom a correction signal which, when combined with the signal being received, permits recovery of the transmitted data in essentially undistorted form.

Description of the prior art

Over the years vast sums of money have been expended in providing telephone transmission equipment designed primarily for voice communication. With the advent of increased demand for transmission of digital data, it has been necessary to develop systems which enable data to be sent over these existing voice transmission lines. To accomplish this, the systems had to overcome a number of problems, the most significant of which is that typical telephone transmission channels exhibit considerable delay distortion. That is, signal components at certain frequencies within the audio passband experience a longer transmission time delay than do components at other frequencies. Although this delay distortion does not significantly impair the intelligibilty of voice signals transmitted over the line, it does cause severe distortion of digital signals transmitted on the line.

In the past, a number of techniques have been used to correct for this transmission path distortion of digital data. For example, if the characteristics of the transmission line are known it is possible to accomplish equalization by predistortion. That is, the signal to be transmitted itself is distorted in a way such that the additional line distortion alters the predistorted signal to produce a received signal having a desired waveshape. Clearly, use of this technique is limited to those situations where the delay characteristics of the line are constant and known.

In the typical situation, the impulse response characteristics of the transmission line in use will not be known and, moreover, may change with time. Prior art transmission systems designed to compensate for such unknown characteristics include the use of equalization networks at the receiving end. These networks function to insert additional delay into the transmission path at those frequencies which experience minimum delay over the transmission line itself. That is, the signal components which are received first are delayed by the equalization network for a time corresponding to the delay time of the remainder of the frequencies transmitted by the line. Such equalization systems, while widely used, suffer the considerable disadvantage that they must be adjusted each time a change in line delay characteristics occurs. The adjustments are tedious, time consuming, and normally must be performed manually.

Another technique to correct for delay distortion on a transmission line involves the use of transversal filters. A transversal filter comprises a tapped delay line and a plurality of multipliers, each associated with a single tap of the delay line. The multipliers adjust the amplitude and polarity of the signal obtained from the delay line at the corresponding tap. The outputs of these multipliers then are summed to provide the transversal filter output. By appropriate selection of the tap intervals and the multiplication factors associated with each of the taps, the filter may be used to accomplish intersymbol cancellation. That is, by selecting the amplitude characteristics of the multipliers to correspond to the impulse response characteristics of the transmission line, the filter effectively will eliminate the ring out associated with a digital pulse transmitted over the line. Optimally, however, the transversal filter should be adjusted to correspond to the impulse response of the line, and this too requires either tedious manual adjustment or complicated circuitry. While a compromise adjustment can be made which will minimize the total distortion interference for lines having a range of impulse response characteristics, this is generally not as satisfactory as adjustment to compensate for the particular line.

Again, transversal filters are limited in that, unless adjusted to match the particular line, they do not completely compensate for the distortion of the signal. Generally, such filters are not adaptive to changes in characteristics of the line. Further, such transversal filters suffer the considerable disadvantage that they are not a digital device but rather require the use of an analogue delay line. While attempts have been made to digitize such transversal filters, this requires the use of complex pulse code modulation techniques and considerable circuitry. Moreover, the delay of the transversal filter optimally must be considerably longer than the ring out of the impulse response. Further, the filter may decrease the signal to noise ratio of the system, due to addition of the noise components at each of the taps.

The invention which forms the subject matter of the present application provides a system for correcting for the distortion of digital data sent over a transmision channel. The inventive impulse response correction system adaptively determines the impulse response of the channel and derives, from the measured impulse response characteristics, a correction signal. This correction signal, when combined with the signal received from the channel allows recovery of the digital signal in essentially undistorted form. The device of the invention uses digital components exclusively and hence lends itself to microminiature implementation; no delay lines are employed.

The apparatus of the invention is adaptive in that it continuously learns and compensates for variations in the impulse response of the transmission channel. Further, the inventive system requires no manual setup or adjustment and hence can be operated essentially unattended. The system may be employed with quadrature and/or multilevel modulation systems which facilitate the transmission of more than one data bit at a time. Cross-channel distortion which may be present in such a system also is corrected adaptively by the invention. When employed, the inventive impulse response correction system allows transmission of digital data over a voice transmission line at rates either above or below the Nyquist rate for that line.

SUMMARY OF THE INVENTION

The inventive impulse response correction system determines the impulse response of the transmission channel in use by cross-correlating the received signal with the data being transmitted. If the transmitted data is sufficiently random, a condition which may be insured by the use of appropriate randomizing equipments, the cross-correlation in effect is a measure of the impulse response characteristics of the channel. The measured impulse response then is used to derive a correction signal which, when combined with the received signal, allows recovery of the transmitted data in essentially undistorted form.

To perform the cross-correlation, the received signal is sampled in amplitude at the data transmission rate. The most recently received data bits are stored in a digital shift register. By amplitude of the received signal at the preceding sample data time then is digitally multiplied by the stored data; that is, the sampled signal is either inverted or not inverted depending on whether a binary one or zero is stored.

The resultant products each are integrated over time to provide a plurality of outputs corresponding to the amplitude and sign of the tail (or ring-out) of the impulse response at the data sample times. By multiplying these impulse response values by the previously received data stored in the shift register and summing the products, a correction signal is derived. The correction signal is subtracted from the received signal to recover the transmitted data.

Appropriate randomization of the transmitted data may be accomplished by modulo-2 addition of the data with the output of a pseudo-random sequence generator. Alternatively, linear sequential coding networks may be used in the transmitter and receiver.

Thus an object of the present invention is to provide a system for determining adaptively the impulse response of a transmission channel.

It is another object of the invention to provide a system for correcting for distortion of a digital data transmitted over a transmission path.

Another object of the invention is to provide a system for learning adaptively the impulse response of a transmission channel and for providing a distortion correction signal derived from the measured impulse response.

A further object of the invention is to provide a system for determining the impulse response of a transmission path using only digital components.

Yet another object of the invention is to provide an impulse response correction system using digital components to cross-correlate the transmitted data with the received signal, thereby to derive the impulse response of a transmission path.

Still another object of the invention is to provide a system for transmitting digital data over a voice transmission path at a rate greater than the Nyquist rate.

A still further object of the invention is to provide a digital impulse response correction system for use in conjunction with a multilevel modulation system to compensate for distortion due to the impulse response of the transmission path and to the cross-channel distortion resultant within the modulation system itself.

These and other objects and features of the invention will become apparent in conjunction with the following description and drawings.

Figure 1:
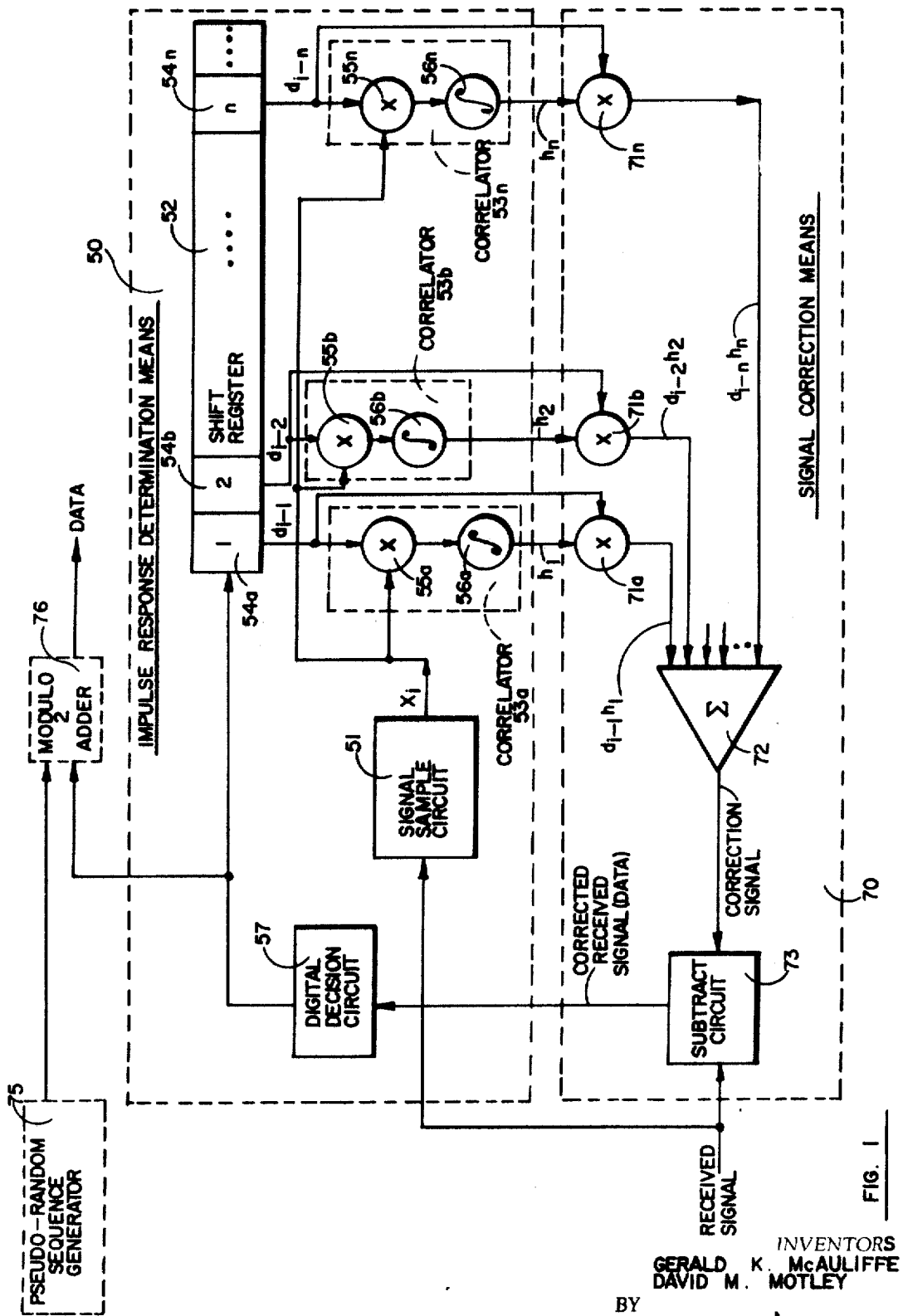
FIG. 1 is a block diagram of a preferred embodiment of the inventive impulse response correction system.
Figure 2:
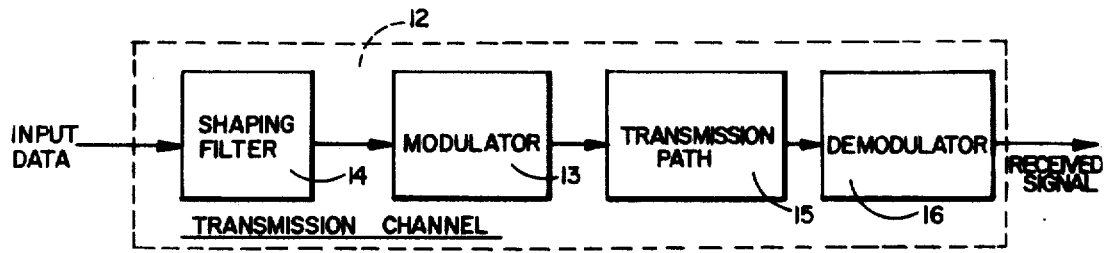
FIG. 2 is a simplified block diagram of a typical data transmission channel with which the system of FIG. 1 might be used.

The graphs of FIG. 4 illustrate several wave forms associated with digital data transmission over a transmission channel such as that illustrated in FIG. 2 and with the operation of the impulse response correction system shown in FIG. 1. In particular:

FIGS. 4a and 4b illustrate typical binary data sequences, in non-return-to-zero and pulse form respectively, which may be sent via a transmission channel.

FIG. 4c illustrates typical impulse response of a transmission channel such as that shown in FIG. 2.

FIG. 4d illustrates the appearance of a signal containing the data sequence of FIG. 4a or 4b as received from a transmission channel having an impulse response similar to that graphed in FIG. 4c.

FIG. 4e represents a correction signal generated by the inventive impulse response correction system of FIG. 1 when receiving the signal shown in FIG. 4d.

FIG. 4f shows the data signal obtained when the correction signal of FIG. 4e is combined with the received signal of FIG. 4d.

Figure 5:
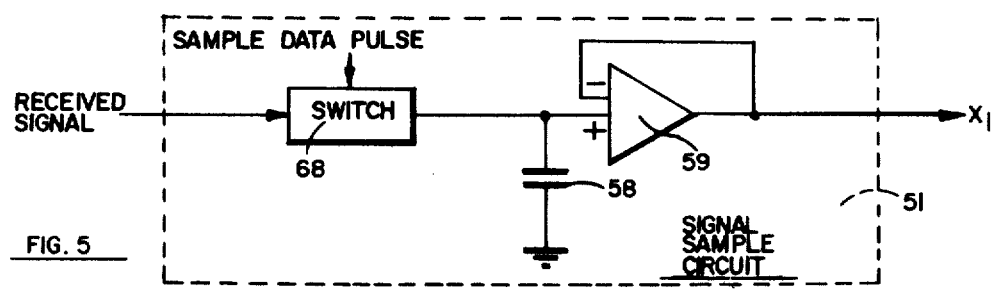

FIG. 5 is a simplified schematic diagram of a signal sample circuit useful in the impulse response correction system of FIG. 1.

Figure 6:
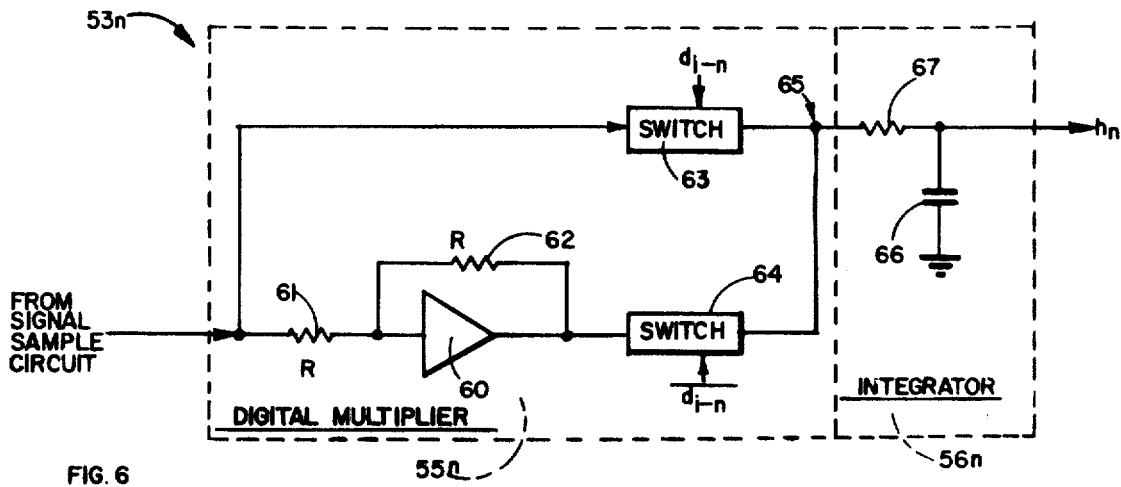

FIG. 6 is a simplified schematic diagram of a digital multiplier and an integrator useful in the impulse response correction system of FIG. 1.

Figure 6A:
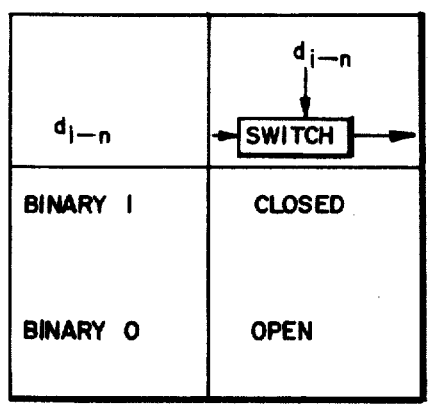

FIG. 6a is a truth table associated with a switch component of the digital multiplier shown in FIG. 6.

FIG. 7 is a simplified block diagram of a two-channel transmitter with which the inventive impulse response correction system may be used.

Figure 8:
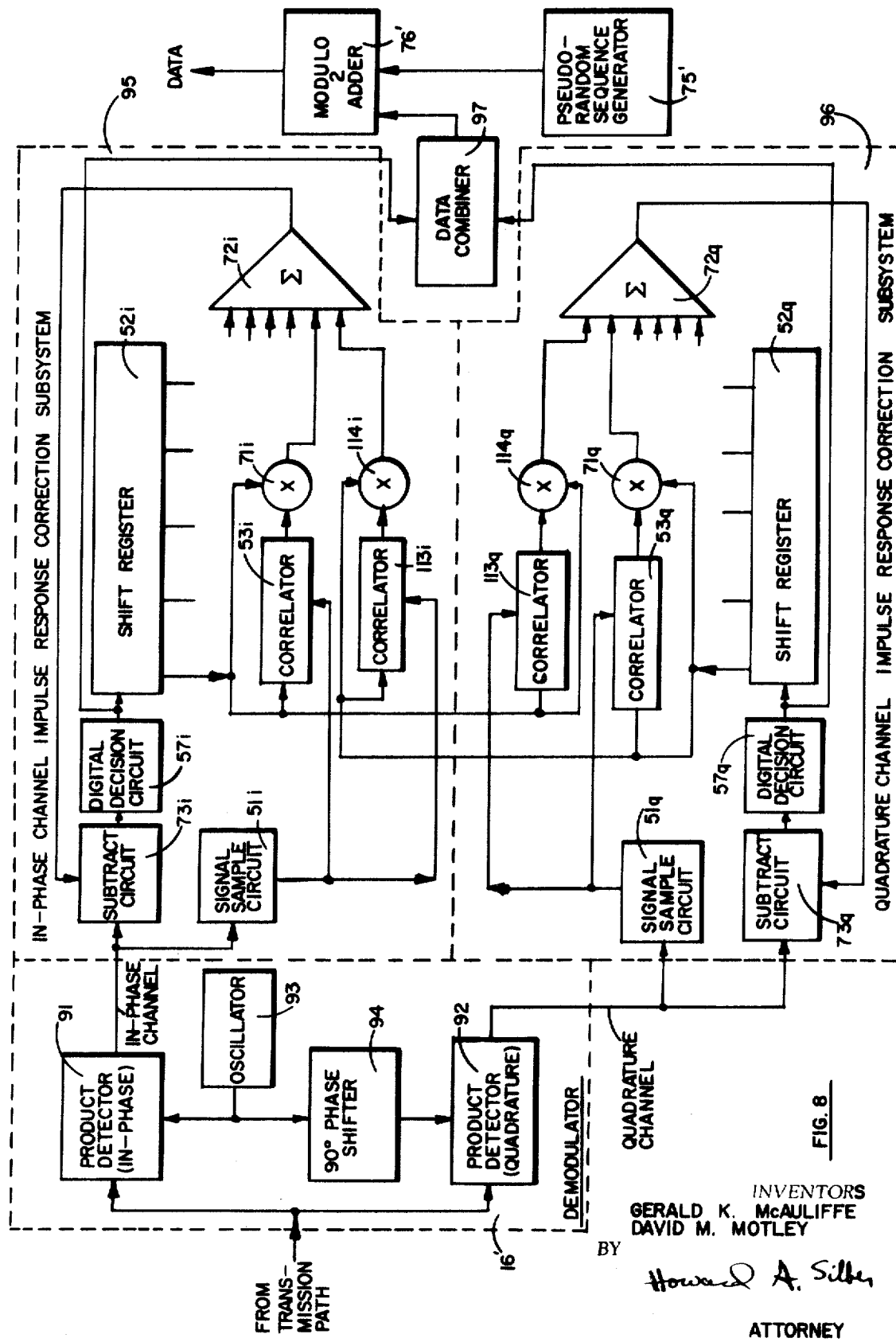

FIG. 8 is a block diagram of the receiver portion of two-channel data transmission system utilizing another embodiment of the inventive impulse response correction sytem.

FIG. 9 shows typical transmission line impulse response characteristics measured in the in-phase channel of the data transmission system of FIGS. 7 and 8.

Figure 9B:
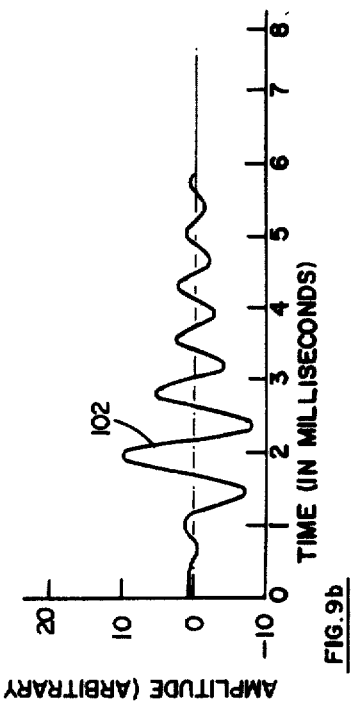

FIG. 9b shows the cross-channel impulse response measured in the in-phase channel of the data transmission system of FIGS. 7 and 8, but resultant from simultaneous data transmission on the quadrature channel.

Figure 10C:
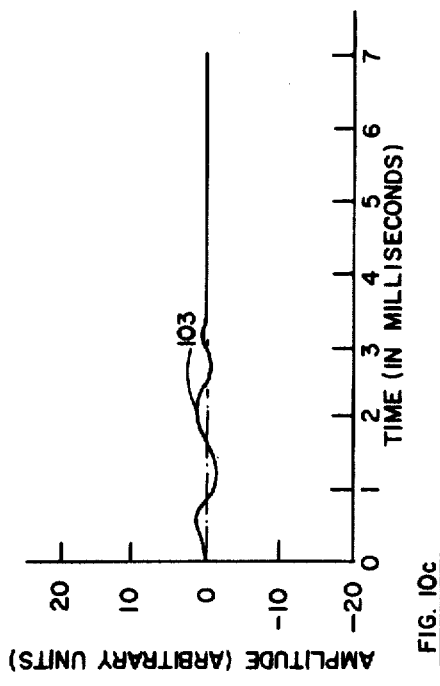
Figure 10A:
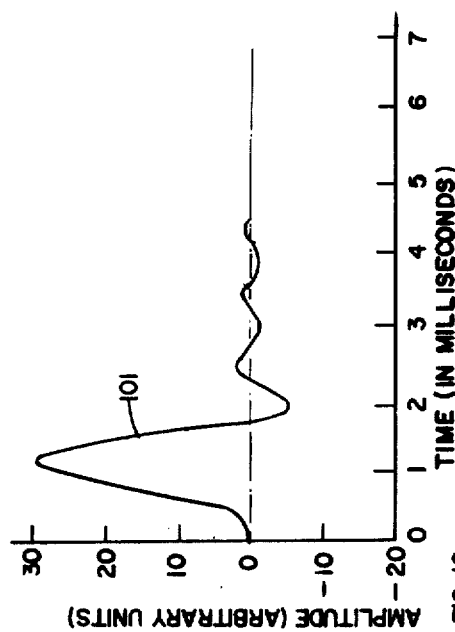

FIGS. 10a and 10b show typical in-phase and cross-channel impulse response characteristics when using cosine-squared shaping filters in the data transmission system.

DESCRIPTION OF THE PREFERRED EMBODIMENTS

A block diagram of a preferred embodiment of the inventive impulse response correction system is shown in FIG. 1. The system accepts a signal from a transmission channel, which signal contains the digital data as originally transmitted but in a form which is distorted due to the impulse response of the channel. The system of FIG. 1 examines this received signal and determines digitally the impulse response of the associated transmission channel. A correction signal then is generated which, when combined with the received signal allows recovery of the transmitted digital data in undistorted form. The system is adaptive; that is, changes in the impulse response characteristics of the transmission channel continuously are sensed and compensated for.

Consider a typical transmission channel such as that shown in block diagram form in FIG. 2. Since digital data cannot be transmitted directly on a voice communication line (since such paths are not adapted to handle DC signals), a modulator 13 is used. Typically, modulator 13 may produce an audio frequency output which is modulated in amplitude, frequency, or phase by the input data. This digital input data itself may be in the nonreturn-to-zero form (see FIG. 4a) or in pulse form (see FIG. 4b). If desired, the input data may be shaped prior to modulation by filters 14, the function of which is described hereinbelow.

The output of modulator 13 is carried by transmission path 15 to a distant location where it is processed by demodulator 16 to produce a received signal. This received signal contains the input data in a form distorted due to the overall impulse response characteristics $h_t$ of transmission channel 12. This impulse response $h_t$ represents the combined distorting effects of shaping filter 14, conversion to and from audio form by modulator 13 and demodulator 16, and the delay and amplitude distortion characteristics of transmission path 15.

In a particular system, the signal distorting characteristics of shaping filter 14, modulator 13, and demodulator 16 may be known and thus readily compensated for. On the other hand, the distortion characteristics of typical transmission path 15 may be unknown and may change with time. Should transmission path 15 include a telephone line, severe delay distortion will be introduced into the transmission path.

Figure 3A:
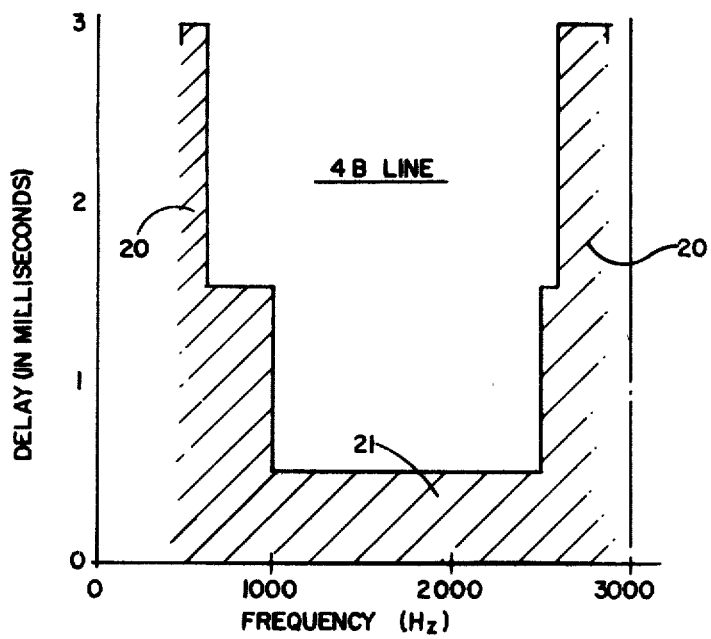
FIGS. 3a and 3b are graphs showing typical delay characteristics of two classes of commercial telephone lines.
Figure 3B:
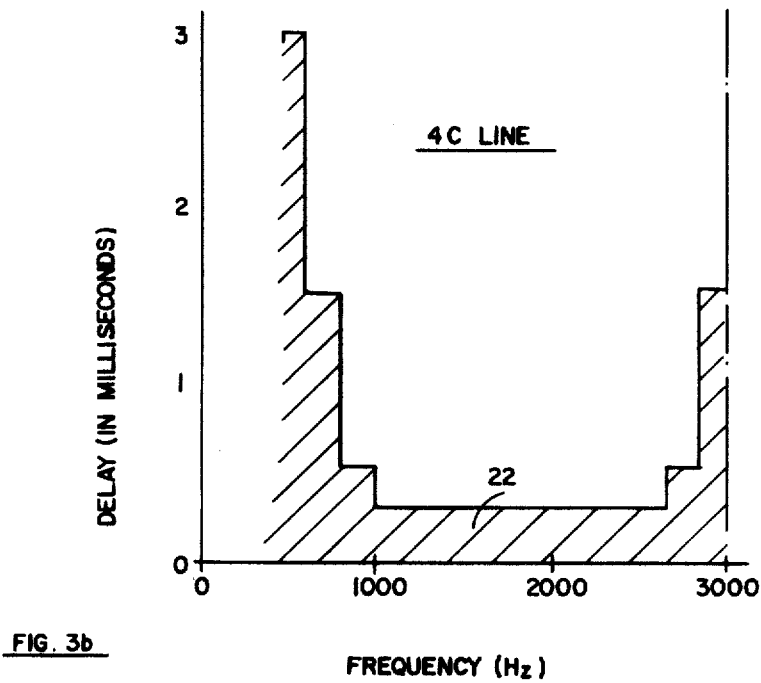

Class 4B or 4C commercial telephone lines, which were designed primarily for voice transmission, have delay characteristics shown graphically in FIGS. 3a and 3b, respectively. Such lines may be used to transmit data. As illustrated by shaded regions 20 (see FIG. 3a) a Class 4B line may exhibit as much as 3 milliseconds delay for signal components below 500 Hz. and above 2800 Hz., while the same Class 4B line (see shaded region 21) may have a delay of less than 500 microseconds between 1000 Hz. and 2600 Hz. Similarly, a Class 4C line may exhibit a delay of less than 300 microseconds at frequencies between 1000 Hz. and 2600 Hz. (see designation 22 of FIG. 3b) while exhibiting longer delay times at other frequencies. These delay characteristics result in considerable distortion of a modulated digital signal transmitted over a telephone line. In fact, it is this delay distortion which in the past has caused most of the difficulty in facilitating high speed data transmission.

The overall impulse response $h_t$ of a typical transmission channel is suggested by curve 25 of FIG. 4c. Curve 25 thus represents the appearance of a received signal obtained from transmission channel 12 (see FIG. 2) were the input data to comprise a single, isolated, pulse 1. Note that curve 25 reaches a positive maxima $h_0$ at time $t_0$ (represented by vertical line 30) and contains trailing components which may be negative or positive in value. The amplitudes of curve 25 at succeeding data transmission times $t_1$ and $t_2$ are represented by $h_1$ (line 31) and $h_2$ (line 32), respectively.

If consecutive data bits are fed to transmission channel 12 at a sufficiently slow rate, the received signal would consist of consecutive bursts, each having the general appearance of curve 25. In such instance, very little distortion of the signal will occur due to ringing associated with the previously received pulse. Such a system would allow error-free data transmission, but would suffer from the serious inconvenience that the minimum time between succeeding data bits must correspond to the period of ring-out of impulse response curve 25. Obviously, this provides a severe handicap not compatible with the high data transmission speeds required today.

Typically, the input data to be sent over a transmission channel may be accepted either in non-return-to-zero form (see FIG. 4a) or in pulse form (see FIG. 4b). In either case, the timing between successive data bits (e.g., between Mark 40 or 40a and succeeding Space 41 or 41a) may be considerably less than the total ring-out time of impulse response curve 25. When such consecutive input data bits are fed to transmission channel 12, the resultant received signal may have the form illustrated by solid curve 45 of FIG. 4d. Note that curve 45 corresponds to the super-position (algebraic sum) of the individual impulse response curves 25, 26, 27, and 28 . . . , corresponding respectively to transmitted data pulses 39, 40, 41, 42 . . . .

It is evident that typical received signal 45 exhibits considerable distortion due to the ring-out of the impulse response curves associated with transmission of the preceding data pulses. As a result, the amplitude of received signal 45 is not the same at each data sampling time $t_0$, $t_1$, $t_2$, $t_3$ . . . . For example, the amplitude of received signal 45 at time $t_0$ (corresponding to the reception of Mark 39 in FIG. 4a) has an amplitude of +4 whereas at times $t_1$ and $t_3$ (corresponding to the transmission of Mark 40 and Mark 42, respectively) received signal 45 has amplitudes of +2 and +7, respectively. Similarly, the amplitude of received signal 45 at time $t_2$ (corresponding to the transmission of Space 41) has an amplitude of −5. Under extreme conditions, depending on the impulse response of the particular transmission channel used and on the data transmitted, the sign of the received signal occasionally may be in error, implying that a Mark has been received when in fact a Space has been transmitted. Similarly, the received signal might be negative (implying reception of a Space) when it should be positive (since a Mark actually was transmitted). Moreover, it is apparent that if multilevel transmission is used (wherein both the amplitude and the sign of the received signal are representative of data) erroneous interpretation of the received data well may result due to impulse response effects of the transmission channel.

The inventive impulse response correction system measures the impulse response of the transmission channel being used and generates a correction signal which, when combined with received signal 45, will permit correct recovery of the transmitted data.

Referring to FIG. 1, note that the received signal (e.g., signal 45 of FIG. 4d) obtained from typical transmission channel 12 (see FIG. 2) simultaneously is fed to impulse response determination means 50 and to signal correction means 70. Impulse response determination means 50 measures the impulse response of the transmission channel being used and produces a set of outputs $h_1$, $h_2$ . . . , $h_n$ . . . indicative of the amplitude of impulse response curve 25 at corresponding data sample times. For example (referring to typical impulse response curve 25 of FIG. 4c), impulse response determination means 50 would produce outputs indicative of $h_1$ at time $t_1$ (having a value of −2 and corresponding to amplitude 31 of FIG. 4c), and $h_2$ having an amplitude of +1, occurring at time $t_1$, and corresponding to amplitude 32 of FIG. 4c.

Signal correction means 70 then utilizes this set of signals (indicative of values of $h_t$) to provide an appropriate correction signal which, when combined with the received signal, will produce a corrected received signal corresponding exactly to the input data fed into transmission channel 12 (see FIG. 2).

Referring to FIG. 1, note that received signal 45 first enters signal sample circuit 51. The function of signal sample circuit 51 is to measure the amplitude of the received signal at each data sample time and to provide an output voltage $X_i$ the amplitude of which is constant for one bit time and equal in amplitude to the signal received at the beginning of the corresponding bit time. Thus in FIG. 4d, $X_i$ is represented by dashed curve 47, which corresponds to received signal 45. In this example, signal 45 sampled at times $t_0$, $t_1$, $t_2$ . . . the occurrence times of sample data pulses 46.

One embodiment of signal sample circuit 51 is shown in FIG. 5. As indicated therein, received signal 45 is fed via switch 68 to capacitor 58. Switch 68 is normally open, but is closed by the occurrence of sample data pulse 46 generated once each bit time by appropriate clocking circuitry (not shown in the figures) well known to those skilled in the art. As illustrated in FIG. 4d, sample data pulses 46 have a time duration considerably shorter than one bit time and, in a system designed to handle data at a rate of 4800 bits per second, may have a duration on the order of 50 microseconds.

Referring still to FIG. 5, when sample data pulse 46 occurs, the received signal passes through switch 68 and changes capacitor 58 to a voltage, and with a polarity, corresponding to that of received signal 45 at the occurrence time of sample data pulse 46. Operational amplifier 59, which has a very high input impedance, samples the voltage present on capacitor 58 and provides a low impedance output having a magnitude and sign indicative of the magnitude and sign of the voltage stored on capacitor 58. Because of the high input impedance of amplifier 59, capacitor 58 is not discharged between the occurrence of successive sample data pulses 46. When the succeeding sample data pulse occurs, capacitor 58 is discharged (via switch 68) and subsequently recharged to the new value of the received signal. Thus, the output of amplifier 59 comprises a signal $X_i$ illustrated by curve 47 of FIG. 4d.

The amplitude $X_i$ of the sampled received signal may be represented by the following equation:

$$X_i = d_i h_0 + d_{i-1} h_1 + d_{i-2} h_2 + \ldots$$

where $i=1, 2, 3 \ldots$ indicates which bit (1st, 2nd, 3rd ...) in the data sequences has just been received. The value of $d_{i-n}$ is $+1$ if the signal received at the $(i-n)^{\text{th}}$ time was interpreted (by digital decision circuit 57) as a binary 1, or $-1$ if interpreted as a binary 0. The values of $h_t$ represent the amplitudes of the impulse response curve 25 at bit sample times 46.

Referring to FIG. 4d, it may be seen that Equation 1 indeed represents the height of curve 47 at the $i^{\text{th}}$ bit time. For example, at time $t_3$ the $i=4^{\text{th}}$ data bit (corresponding to bit 42 in FIG. 4a) has just been received. Since bit 42 is a binary 1, $d_i = d_4 = +1$. The preceding $(i-1)^{\text{th}}$ bit received (corresponding to bit 41 in FIG. 4a) was a binary 0, hence $d_{i-1} = d_3 = -1$. Similarly $$d_{i-2} = d_2 = +1$$

(since bit 40 is a binary 1) and $d_{i-3} = d_1 = +1$ (since bit 39 also is a binary 1). Substituting into Equation 1, it is apparent that $$X_4 = (+1)(4) + (-1)(-2) + (+1)(1) + (+1)(0) = 4 + 2 + 1 = 7$$

where of course $h_0=4$, $h_1=-2$, $h_2=+1$, and $h_3=0$ as apparent from impulse response curve 25 in FIG. 4c. Note that Equations 1 and 2 thus correctly described the amplitude of curve 45 (see FIG. 4d).

Referring once again to FIG. 1, note that the received data from signal correction means 70 is fed via digital decision circuit 57 into digital shift register 52.

Digital decision circuit 57 provides a binary 1 input to shift register 52 if the signal from correction means 70 is positive, and a binary 0 if the signal is negative. In a preferred embodiment, shift register 52 can store at least that number of bits which may be transmitted during the ring-out period of impulse response curve of the transmission channel in use. Thus, in our example, where the impulse response of transmission channel 12 is represented by the curve 25 (FIG. 4c), shift register 52 should be at least 2 bits long, since in three bit times the tail of input response curve 25 is of a negligible amplitude. It should be apparent that the first cell 54a of shift register 52 then contains the binary bit received at the $(i-1)^{\text{th}}$ data time. Similarly, second cell 54b contains the bit received at the $(i-2)^{\text{th}}$ data time, and the $n^{\text{th}}$ cell 54n contains the bit received at the $(i-n)^{\text{th}}$ data time.

Referring to FIG. 1, each cell 54a, 54b ... 54n ... of shift register 52 provides an input to a corresponding one of identical correlators 53a, 53b ... 53n .... The output $X_i$ from signal sample circuit 51 also is fed to each of correlators 53. Correlators 53a, 53b ... 53n ... each comprises digital multiplier 55 and an integrator 56, preferred embodiments of which are shown schematically in FIG. 6.

The operation of correlators 53 may be understood by reference to typical correlator 53n, associated with $n^{\text{th}}$ cell 54n of shift register 52. Digital multiplier 55n provides an output to integrator 56n which has the same amplitude as $X_i$, with either the same or opposite sign depending on whether the bit stored in cell 54n is a binary 1 or binary 0. That is, digital multiplier 55n maintains the sense (polarity) of $X_i$ if $d_{i-n} = +1$ (binary 1) or changes the sense (inverts the polarity) of $X_i$ if $d_{i-n} = -1$ (binary 0).

A preferred embodiment of digital multiplier 55 is shown in block diagram form in FIG. 6. Digital multiplier 55 comprises operational amplifier 60 having an input resistance 61 of value R and a shunt resistance 62 also of value R. As is well known to those skilled in the art, such an operational amplifier exhibits unitary gain but inverts polarity of the input signal. Digital multiplier 55 also comprises two identical switches 63 and 64 which are controlled by complementary inputs $d_{i-n}$ and $\overline{d_{i-n}}$ as shown in the truth table of FIG. 6a, when a binary 1 is stored in the $n^{\text{th}}$ cell 54n of shift register 52, switch 63 will be closed. At the same time, the complementary input (represensed by $\overline{d_{i-n}}$) to switch 64 will be false, hence switch 64 will be open. Thus, the $X_i$ input from signal sampler circuit 51 will appear at output point 65 of digital multiplier 55 (via closed switch 63) without a change of sign. Alternately, if cell 54n should contain a binary zero, the input to switch 63 will be false, while the input to switch 64 will be true. In this instance, the input from signal sample circuit 51 will proceed output terminal 65 via inverting operational amplifier 60. Thus, the output of digital multiplier 55 will be equal in magnitude, but opposite in polarity, to the input signal $X_i$.

Referring to the example illustrated by the curves of FIG. 4, at time $t_3$, the sampled received signal $X_i$ (see curve 47) has a value of $+7$. The data pulse received at time $t_2$ was a binary zero and now is stored in cell 54a of shift register 52, thus $d_{i-1}$ represents a binary zero. Digital multiplier 55a interprets $d_{i-1}$ in a sense which causes inversion of the sign of input $X_i$, hence the output of digital multiplier 55a is a signal having an amplitude of $-7$. On the other hand, the signal received at time $i-2=t_1$ was a binary one, and this value is now stored in cell 54b of shift register 52. Thus, $d_{i-2}$ represents a binary one, and this is interpreted by digital multiplier 55b in correlator 53b in a manner which does not invert the sign of $X_i$. The output of digital multiplier 55b thus will be a signal whose amplitude is $+7$.

Recalling the output $X_i$ of signal sample circuit 51 is given in Equation 1 above, it is apparent that the accumulated output from the $n^{\text{th}}$ digital multiplier 55n may be expressed in the following form:

$$d_{i-n} X_i = (d_{i-n})(d_i) h_0 + (d_{i-n})(d_{i-1}) h_1 + (d_{i-n}) d_{i-2}) h_2 + \ldots + (d_{i-n})(d_{i-n}) h_n + \ldots \quad (3)$$

where digital multiplier 55n has multiplied $X_i$ by $d_{i-n}$. The symbols in Equation 3 have the same meaning as those in Equation 1 hereinabove; specifically $(d_{i-n})$ will have a value of either $+1$ or $=-1$, depending on whether the signal received $n$ bits earlier had been interpreted as a binary 1 or binary 0.

Regardless of whether the value of $(d_{i-n})$ is $+1$ or $-1$, the product $(d_{i-n})(d_{i-n}) = 1$, hence in Equation 3 the term $(d_{i-n})(d_{i-n}) h_n$ always will equal $h_n$. Equation 3 thus can be simplified into the form:

$$d_{i-n} X_i = (d_{i-n})(d_i) h_0 + (d_{i-n})(d_{i-1}) h_1 + (d_{i-n})(d_{i-2}) h_2 + \ldots + h_n + \ldots \quad (4)$$

which Equation 4 represents the output from representative digital multiplier 55n (see FIG. 1).

The outputs of digital multipliers 55a, 55b ... 55n ... respectively are fed to integrators 56a, 56b ... 56n .... The function of integrators 56 is to average the output voltage level of the associated digital multiplier 55 over a relatively long time duration. While this time duration $i_s$ by no means critical, in a preferred embodiment, the period over which the integration is taken may be on the order of 10,000 bit times. Note, however, that the rate which the inventive impulse response correction system adapts itself to variations in the impulse response of transmission channel 12 will depend on the time constant of integrator 56. It has been found that when integrator 56 has a relatively short time constant, e.g., less than 100 bit times, the correction system will adapt itself very rapidly to the impulse response of transmission channel 12. However, with such short time constants, noise may be introduced into the system by the integrator.

One possible embodiment of integrator 56 is shown in FIG. 6. Here integrator 56n simply comprises capacitor 66, which is charged via resistor 67. The integration period of integrator 56n is determined by the values of capacitor 66 and resistor 67, in a manner well known to those skilled in the art. The output voltage which appears across capacitor 66 represents the time integral of the voltage waveform present at the output point 65 of digital multiplier 55n.

If the incoming data is sufficiently random, approximately an equal number of binary ones and binary zeros will be received over a long duration of time. Further, the order in which individual binary ones and binary zeros occur will be essentially random. Under these conditions, the output signals from correlators 53a, 53b . . . 53n . . . will represent respectively the values of $h_1$, $h_2$ . . . $h_n$ . . . , both in magnitude and sign. Thus correlators 53 provide output indicative of the input response of transmission channel 12 being employed. In the example of FIG. 4, the output signals of correlators 53a and 53b would represent in ampltiude and sign the values of $h_1$ and $h_2$, respectively; these values are designated 31 and 32 (see input response curve 25 of FIG. 4c).

That the outputs of correlators 53 should represent the transmission channel impulse response also is indicated by analysis of Equation 4. If the received data is sufficiently random, over a period of time the average value of $(d_{i-n})(d_i)$ will equal zero; similarly, the average value of $(d_{i-n})(d_{i-1})$ will equal zero, the average value of $(d_{i-n})(d_{i-2})$ will equal zero, and so forth. That is true since, on the average, the autocorrelation of successive data bits will be zero. That is, $d_{i-1}$ and $d_i$ will assume the values $+1$ and $-1$ for approximately equal number of times and with roughly random occurrence. Thus, when averaged over time, these factors drop out of Equation 4 and the only term remaining will be $h_n$. Alternately expressed, the output signals from correlators 53a, 53b . . . 53n . . . may be represented by:

$$\int (d_{i-n})X_i dt = h_n \qquad (5)$$

It will be appreciated that cross-correlation is employed in impulse response determination means 50 to measure the overall impulse response $h_t$ of transmission channel 12. Specifically, the system utilizes the principle that if the autocorrelation of the transmission channel input signal is a delta function, then the cross-correlation between the transmission channel input and output signals corresponds to the impulse response $h_t$ of the channel.

The power spectrum of a true delta function is constant over the entire frequency spectrum, and, of course, represents a physically unrealizable signal. However, it is not necessary to use a true delta function to obtain a measure of the impulse response of a transmission channel. Instead, an input signal containing finite power, the autocorrelation of which is approximately equal to a delta function and the power spectrum of which is approximately constant over the bandwidth of the channel may be used. A random, binary data sequence represents such a signal.

Note in FIG. 1 that the binary data stored in shift register 52 is identical to the input signal to transmission channel 12. Moreover, the received signal fed to signal sample circuit 51 is just the output signal obtained from transmission channel 12. These two signals are cross-correlated by impulse determination means 50, to obtain (assuming sufficient randomness of the input binary sequence) the impulse response $h_t$ of transmission channel 12.

Referring again to FIG. 1, the output signals from impulse response determination means 50 (corresponding to the measured values of $h_t$) are used by signal correction means 70 to derive an appropriate correction signal which, when combined with the received signal, permits recovery of the original input data. Analysis of FIG. 4c indicates the nature of the required correction signal. For example, note that the amplitude of curve 28 at time $t_3$ represents the portion of the received signal which results directly from transmission of binary one bit 42 (see FIG. 4a or 4b). However, at time $t_3$, received signal 45 (see FIG. 4d) also contains energy components contributed by curves 26 and 27, the impulse response curves resulting from the transmission of data bits 40 and 41, respectively. Thus curve 26 contributes an energy component $+h_2$ (indicated by point 32') having an amplitude and sign equal to that of point 32. Likewise curve 27 contributes a component $-h$, (see point 31') having a magnitude equal to that of point 31 but of opposite sense (since curve 27 results from transmission of a binary 0). It is apparent that the necessary correction signal (at time $t_3$) thus will equal the sum of the impulse response amplitudes at points 31' and 32'. And of course, the correction signal must be subtracted from received signal 45.

More generally, the desired correction signal at a particular data sample time is given by the following equation:

$$\text{Correction Signal} = (d_{i-1})h_1 + (d_{i-2})h_2 + \ldots + (h_{i-n})h_n + \ldots \qquad (6)$$

where the various symbols correspond to those defined hereinabove.

To obtain this correction signal, signal correction means 70 (see FIG. 1) utilizes a plurality of digital multipliers 71a, 71b . . . 71n . . . each of which accepts, as one input, the output from corresponding correlator 53a, 53b . . . , 53n . . . of impulse response determination means 50. As a second input, each digital multiplier 71 receives a signal indicative of the datum present in the corresponding cell 54 of shift register 52. Thus, for example, digital multiplier 71a, receives as a first input a signal (indicative of the impulse response value $h1$) from correlator 53a. Digital multiplier 71a also receives an input $d_{i-1}$ indicative of whether a binary one or binary zero (received one bit time earlier) now is stored in cell 54a of shift register 52.

Digital multipliers 71 each are identical in function to digital multipliers 55 and each may utilize the circuit shown in FIG. 6. The output of typical digital multiplier 71n will be a signal having an amplitude equal to that of impulse response signal $h_n$ (from correlator 53n), and having a polarity which is the same as that of $h_n$ (if $d_{i-n} = +1$, indicating a binary 1 in cell 54n) or opposite that of $h_n$ (if $d_{i-n} = -1$, indicating a binary 0 is stored in cell 54n of shift register 52). Thus, it is apparent that the output of $n^{th}$ digital multiplier 71n is given by $(d_{i-n})h_n$. The desired correction signal then is obtained by summing the outputs of digital multipliers 71a, 71b . . . 71n . . . in summing amplifier 72. The correction signal 23 obtained from amplifier 72 is represented exactly by Equation 6 above, and may have the general appearance illustrated in FIG. 4e.

To reconstruct the original input data, the correction signal from summing amplifier 72 is combined with the received signal in substract circuit 73 to produce a corrected received signal. As may be seen in the example of FIG. 4, subtraction of correction signal 23 (in FIG. 4e) from received signal 45 produces the corrected received signal 24 illustrated in FIG. 4f. Note that in this idealized example, corrected received signal 24 corresponds exactly to the transmission channel input data indicated by curve 4a or 4b. Further note that the amplitude of each of the received data pulses (in FIG. 4e) are equal, i.e., the ambiguity previously associated with received signal 45 has been eliminated completely.

However, during the impulse response learning period, signal 23 may not be exactly equal to signal 4a or 4b. For this reason digital decision circuit 57 in FIG. 1 is utilized to produce a logic "1" if signal 23 is positive and a logic "0" if signal 23 is negative. The digital output of digital decision circuit 57 is then always in the proper form to feed digital shift register 52 of FIG. 1.

From the above description, it is apparent that for most accurate measurement of the impulse response values $h_1$, $h_2 \ldots h_n \ldots$, and hence for optimum operation of the inventive impulse response correction system, it is desirable that the transmitted data be as nearly random as possible. Randomness of the data may be ensured by combining the digital information to be transmitted with the output of a digital pseudo-random sequence generator in a modulo 2 adder. Modulo 2 addition of a pseudo-random sequence with the input information will produce a data sequence which itself is random. To recover the original information, the corrected received signal may be combined with the output of an identical pseudo-random sequence generator in another modulo 2 adder.

Referring to FIG. 1, if the input data introduced into transmission channel 12 has been combined with a pseudo-random sequence, the data output from subtract circuit 73 may be combined in modulo 2 adder 76 with the output of pseudo-random sequence generator 75. If sequence generator 75 is configured to produce a pseudo-random sequence identical to that used at the transmitter, the output from modulo 2 adder 76 will be an exact replica of the original transmitted data.

The design and operation of pseudo-random sequence generator 75 are well known to those skilled in the art, and are described, for example, in the reference "Digital Communications With Space Applications" by S. M. Golomb et al., Prentice-Hall, New Jersey (1964). Modulo 2 adder 76 comprises a circuit which functions in accordance with the following truth table:

TABLE I

| Output from pseudo-random sequence generator | Data to be transmitted | Output of Modulo 2 adder |
|---|---|---|
| 0 | 0 | 1 |
| 1 | 0 | 0 |
| 0 | 1 | 0 |
| 1 | 1 | 1 |

Alternately, the use of linear sequential coding networks in conjunction with the data to be transmitted can produce a transmitted sequence which is approximately random. To recover the original data, the corrected digital signal from digital decision circuit 57 may be fed through the inverse of the linear sequential coding network used at the transmitter. Linear coding networks useful with the inventive impulse response correction system are described in the reference article entitled "The Synthesis of Linear Sequential Coding Networks" by D. A. Huffman, printed in the book "Information Theory," Colin Cherry (Ed.) Academic Press, New York (1956). Use of linear coding networks eliminates the problem of synchronizing the transmitter and receiver pseudo-random sequence generators.

To insure maximum utilization of transmission channel, it is possible to utilize two orthogonal subchannels with multilevel amplitude modulation on each subchannel. With this arrangement, more than one bit of information may be transmitted in each Nyquist interval. (A Nyquist interval is that time period in which successive impulses may be transmitted by a channel without interference between the peaks of the received pulses; the corresponding Nyquist rate is a rate in bits-per-second numerically equal to twice the available channel bandwidth in cycles per second.)

An example of such a modulation system without the multilevel amplitude modulation is illustrated by the block diagrams in FIG. 7 (transmitter section) and FIG. 8 (receiver section). This system transmits a four-vector signal generated by combining two AM waves in quadrature. The operation of appropriate modulator and demodulators for such a four-vector modulation system are described on pages 202 and 203 of the book entitled "Data Transmission" by William R. Bennett and James R. Davey, published by McGraw-Hill Book Company, New York, 1965. The system depicted in FIGS. 7 and 8 utilizes psuedo-random sequence generation to insure that the data sent over the transmission channel will be random. Further, the system utilizes impulse response correction circuitry representing a second embodiment of the present invention. This impulse response correction system not only compensates for the impulse response of the in-phase and quadrature transmission channels, but also compensates for distortion due to cross-channel interaction.

Referring to FIG. 7, there is shown a simplified block diagram of the transmission portion of a digital data communications system utilizing four-vector modulation. The data to be transmitted first is randomized by combination in modulo 2 adder 78 with the output from pseudo-random sequence generator 77. These items function in a manner identical to that described hereinabove in conjunction with FIG. 1. The randomized input data obtained from modulo 2 adder 78 is analogous to the input data fed to transmission channel 12 illustrated in FIG. 2. Shaping filters 81 and 81' (in FIG. 7) correspond to shaping filter 14 of FIG. 2 and the remainder of the blocks in FIG. 7 correspond to modulator 13 of FIG 2.

Referring again to FIG. 7, the randomized input data enters data splitter 80, the function of which is to direct alternate input data bits first to in-phase modulator 82 and then to quadrature modulator 83. That is, the first data bit received by data splitter 80 will be directed to modulator 82, the second data bit to modulator 83, the third data bit to modulator 82, the fourth data bit to modulator 83, and so fourth. The digital logic required to accomplish the function of data splitter 80 is well known to those skilled in the art.

Figure 9A:
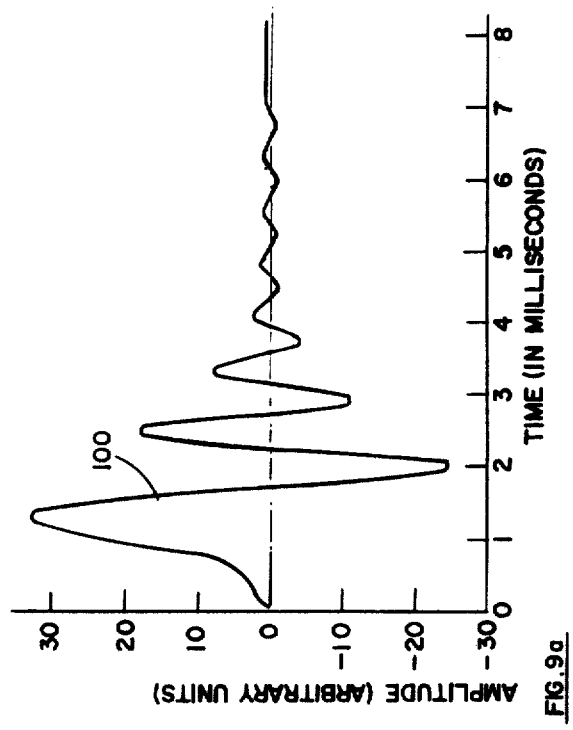

The data bits fed to modulators 82 and 83 pass through shaping filters 81 and 81', respectively, which filters in a preferred embodiment may be of the cosine-squared variety. Preshaping of the input data results in a reduction of the ringing associated with the received data pulses. For example, the graph of FIG. 9a shows the in-phase channel impulse response characteristics of a typical 4B telephone transmission path using a carrier frequency of 1800 HMz., but using no pulse shaping filter. Note in FIG. 9a that considerable ringing is present, i.e., that the tail of impulse response curve 100 has many excursions of considerable amplitude. By preshaping the input data through a cosine-squared filter such as shaping filter 81, the effective impulse response of the same channel (as shown by curve 101 of FIG. 10a) exhibits significantly less ringing then is experienced when the input data is not filtered. This improvement in the impulse response characteristics of the transmission channel itself aids in reducing the distortion of transmitted data.

Referring again to FIG. 7, in-phase modulator 82 accepts a carrier from oscillator 84, the frequency of which is within the passband of transmission path 15. For applications using commercial telephone transmission lines, oscillator 84 may have a frequency in the order of 1800 Hz. The output of modulator 82 comprises a carrier which corresponds in phase to the output of oscillator 84 when a binary one is received from shaping filter 81, and which is 180° out of phase with respect to the signal from oscillator 84 when the data bit from shaping filter 81 is a binary zero.

Quadrature modulator 83 is fed by a signal from oscillator 84, which signal is shifted, by phase shifter 85, to lead by 90° the oscillator output. When a binary one is received from shaping filter 81', the output of quadrature modulator 83 will comprise a carrier which is in phase with the output of phase shifter 85, (i.e., which leads the output of oscillator 84 by 90°). Alternately, when the output from shaping filter 81' is a binary zero, the output of quadrature modulator 83 is a carrier which is 180° out of phase with respect to the output of phase shifter 85 (i.e., which lags the output of oscillator 84 by 90°).

The outputs of in-phase modulator 82 and quadrature modulator 83 are combined in summing circuit 86 to provide a single output to transmission path 15 (see FIG. 2). This output signal has a frequency corresponding to that of oscillator 84, and exhibits periodic phase changes. Ideally, the net phase shift of this signal will be either +45°, −45°, +135°, or −135°.

If two successive binary 1 bits are received by data splitter 80, the output from in-phase modulator 82 will be an audio signal whose phase lags that of the output of quadrature modulator 83 by 90°. Thus, the net phase shift of the output signal from summing circuit 86 will be +45°. As indicated by the idealized phase diagram of FIG. 7a if two successive binary zeros are received by data splitter 80, this will result in a net phase shift of −135°. Should successive bits be a zero and a one, a phase change of +135° will occur. Similarly, a change of −135°° will occur for two consecutive binary zero data bits.

FIG. 8 shows a block diagram of a data transmission system receive section which may be used in conjunction with the transmission section illustrated in FIG. 7. An incoming signal from the transmission path is fed simultaneously to in-phase product detector 91 and quadrature product detector 92 in demodulator 16'. Product detector 91 also accepts a carrier from oscillator 93 at a frequency identical to that of oscillator 84 (see FIG. 7). Similarly, product detector 92 accepts a carrier generated by oscillator 93 but shifted +90° by phase shifter 94. The operation of demodulator 16' is well known to those skilled in the art and is described for example, beginning on page 203 of the book "Data Transmission" referenced hereinabove.

The output of in-phase product detector 91 comprises a signal, not unlike that depicted by curve 45 of FIG. 4d, which contains alternate bits of the original input data. Distortion of this in-phase channel signal in part will reflect the impulse response characteristics $h_t$ of the transmission channel utilized. This in-phase channel impulse response may correspond to the typical curves of FIG. 9a (no preshaping filter) or FIG. 10a (shaping filter 81 used). The output of in-phase product detector 91 also will exhibit cross-channel distortion effects resulting from the simultaneous transmission of alternate data bits in the quadrature channel. This cross-channel distortion may be represented as an impulse response between the quadrature and in-phase channel, and typically may have the appearance of curve 102 in FIG. 9b (if no shaping filters are used in the transmission channel), or that of curve 103 in FIG. 10b (using cosine-squared filtering). Note in this regard that use of a cosine-squared filter reduces considerably the cross-channel distortion.

The output of quadrature channel product detector 92 will be a signal, similar to that of curve 45 in FIG. 4d, which contains the alternate data bits not recovered from the in-phase channel. This quadrature channel signal itself will be distorted due both to the impulse response characteristics of the transmission channel and also to cross-channel intermodulation effects from the in-phase channel.

The data receiver shown in FIG. 8 utilizes separate impulse response correction subsystems 95 and 96 for each of the in-phase and quadrature channels. Further, each impulse response correction subsystem is configured to derive both the cross-channel and the in-channel impulse response. A combined correction signal compensating for distortion due to both of these sources is derived and used to correct the received signal in the associated in-phase or quadrature channel.

In-phase channel impulse response correction subsystem 95 (see FIG. 8) comprises signal sample circuit 51i, digital decision circuit 57i, shift register 52i and correlators 53i (only one of which is shown in FIG. 8), each of which is identical to the correspondingly-numbered block in FIG. 1. These components comprise means for determining the impulse response of the in-phase channel itself, and for providing via digital multipliers 71i (only one shown) and summing amplifier 72i, a correction signal to compensate for this impulse response.

Similarly, quadrature channel response correction subsystem 96 (see FIG. 8) comprises signal sample circuit 51q, digital decision circuit 57q, shift register 52q, and correlators 53q (only one of which is shown in FIG. 8) comprise means for determining the impulse response of the quadrature channel itself. Digital multipliers 71q (only one shown), and summing amplifier 72q then generate an appropriate correction signal to compensate for this impulse response.

In-phase channel impulse response correction subsystem 95 also comprises a second set of correlators 113i (only one of which is shown in FIG. 8) which are associated with respective cells of quadrature channel shift register 52q. Correlators 113i each may be of a design identical to that described hereinabove in conjunction with FIG. 6. Correlators 113i digitally correlate the signal received on the in-phase channel with the data bits previously received on the quadrature channel and stored in shift register 52q. Thus, the outputs of correlators 113i represent the effective impulse response in the in-phase channel resulting from simultaneous transmission of data in the quadrature channel. This cross-channel impulse response corresponds to that depicted by curve 102 (FIG. 9b) or 103 (FIG. 10b).

The output of each correlator 113i is fed to an associated one of digital multipliers 114i (only one of which is shown in FIG. 8) which digital multiplier 114i also receives an input from a corresponding cell of shift register 52q. Digital multipliers 114i thus facilitate multiplication of the cross-channel impulse response with the data bits previously received on the quadrature channel (and stored in shift register 52q). The outputs of digital multipliers 114i also are fed to summing amplifier 72i.

The output of summing amplifier 72i represents a combined in-phase channel correction signal compensating for both the in-phase impulse response and the cross-channel impulse response. This combined correction signal is subtracted from the received signal from in-phase product detector 91 in subtract circuit 73i. Thus, the output of subtract circuit is a corrected in-phase channel signal containing those alternate input data bits which were transmitted via in-phase modulator 82 (see FIG. 7).

Similarly, quadrature channel impulse response correction subsystem 96 is provided with a second set of correlators 113q which correlate the signal received on the quadrature channel (as sampled by signal sample circuit 51q) with the data bits previously received in the in-phase channel (and stored in shift register 52i). Thus the outputs of correlators 113q comprise signals indicative of the cross-channel impulse response. These cross-channel impulse response values then are multiplied by digital multipliers 114q (only one of which is shown in FIG. 8) with the previously received data from in-phase channel shift register 52i. The outputs of digital multipliers 114q also are fed to summing amplifier 72q. Thus, the output of summing amplifier 72q comprises a correction signal which will compensate for distortion due both to the impulse response of the quadrature transmission channel and also to the cross-channel impulse response resulting from simultaneous transmission of data in the in-phase channel.

The correction signal from summing amplifier 72q is combined with the received quadrature channel signals (from quadrature product detector 92) by subtract circuit 73q. The output of subtract circuit 73q thus contains the corrected quadrature channel received signal, i.e., it contains those alternate input data bits which originally were transmitted via quadrature modulator 83 (see FIG. 7).

Finally, data combiner 97 is used to combine the corrected received signals from the in-phase and quadrature channels into a single data stream identical to the randomized input data present at the input of data splitter 80 (see FIG. 7). The original data then may be recovered utilizing pseudo-random sequence generator 75' and modulo 2 adder 76'. Should generator 75 produce a random sequence identical to that generated by a pseudo-random sequence generator 77, the output from modulo 2 adder 76' will be identical to that data originally fed to modulo 2 adder 78 in the transmit system of FIG. 7.

It will be appreciated that the inventive impulse response correction system is capable of operation in conjunction with multi-level modulation systems. When so used, it is possible to obtain the impulse response of the transmission channel by correlating the sampled received signal with the previously received most significant bits only. An appropriate correction signal then may be obtained by first digitally multiplying the impulse response both by the previously received most significant data bits and by the previously received bits of lesser significance, and then summing the products. For greater accuracy, the products derived from the bits of most significance may be weighted more heavily in the summation than those products derived from the bits of lesser significance.

Although the invention has been described in detail, it is to be understood that the same is by way of illustration and example only, and is not to be taken by way of limitation, the spirit and scope of this invention being limited only by the terms of the appended claims.

What is claimed is:

1. An apparatus for determining the impulse response of a digital data transmission channel, said apparatus comprising, in combination:
   means for storing a most recently corrected digital data signal;
   means for correlating a received digital data signal with said most recently corrected digital data signal to provide a correction signal; and
   subtracting means for subtracting said correction signal from said received digital data signal to provide a most recently corrected signal to said storing means.

2. The apparatus according to claim 1 wherein said means for storing is comprised of:
   a shift register having $n$ cells for storing the most recentlly received $n$ data bits, $n$ being an integer greater than 1; and further comprising:
      a signal sample means for periodically sampling the received digital data signal and for providing an output having an amplitude equal to that of the signal sampled at the sample time to said correlators for multiplication.

3. The apparatus defined in claim 2 wherein $n$ is at least as great as the number of data bits transmitted during the ring-out of said impulse response.

4. The apparatus as defined in claim 2 further comprising means for randomizing said transmitted digital data.

5. An apparatus for correcting the distortion of digital data sent via a transmission channel, said apparatus comprising:
   a means for continuously determining digitally the impulse response of said channel, said means comprising a shift register having $n$ cells for storing the most recently received corrected $n$ data bits, $n$ being an integer greater than 1,
   signal sample means for periodically sampling the signal received from said transmission channel and for providing an output having an amplitude equal to that of said signal at the sample time;
   $n$ correlators, each associated with a corresponding cell of said shift register, each correlator comprising:
      multiplier means for digitally multiplying said output by said most recently received corrected $n$ data bits;
      integrator means for integrating the output signal from said multiplier means to provide a signal indicative of the amplitude of the impulse response of the transmission channel;
      means for providing a correction signal derived from said signal indicative of the transmisison channel impulse response; and
      a subtracting means for subtracting said correction signal from said signal received from said transmission channel to provide a received corrected $n$ data bit signal to said shift register.

6. The apparatus defined in claim 5 wherein said means for providing a correction signal comprises:
   $n$ digital multipliers, each associated with a corresponding one of said correlators, each of said multipliers comprising means for deriving an output signal equal in amplitude to said integrated output signal from said corresponding integrator means and having a sign corresponding to that of said integrated signal output if the datum in the cell corresponding to said correlator is true and opposite to that of said integated signal output if said datum is false, and
   means for summing the output of said $n$ digital multipliers to provide a correction signal.

7. The apparatus as defined in claim 6 further comprising digital decision means connected between said subtracting means and said shift register for providing a binary output the sense of which is determined by the sign of said corrected received $n$ data bit signal.

8. The apparatus as defined in claim 7 further comprising means for randomizing the data to be transmitted.

9. The apparatus as defined in claim 8 wherein said means for randomizing comprises
   a first pseudo-random sequence generator, and
   a first modulo-2 adder for combining said data to be transmitted with the output of said first pseudo-random sequence generator.

10. The apparatus as defined in claim 9 further comprising means for recovering said transmitted data from said corrected received signal comprising,
    a second pseudo-random sequence generator, and
    a second modulo-2 adder for combining said corrected received signal from said digital decision means with the output of said second pseudo-random sequence generator, and
    means for synchronizing said first and second pseudo-random sequence generators.

11. The apparatus as defined in claim 8 wherein said means for randomizing comprises a linear sequential coding network for randomizing said transmitted data and an inverse linear sequential coding network for recovering said transmitted data from said corrected received signal.

12. The apparatus as defined in claim 5 further comprising,
    means for eliminating energy components prior to the major pulse of said impulse response.

13. In conjunction with a multilevel modulation system, the apparatus defined in claim 5 wherein said stored corrected data bits comprise only the most significant bits of said digital data.

14. The apparatus defined in claim 13 and further comprising:
    a second multiplier means for digitally multiplying said most significant corrected data bits by the lesser significant bits of said received digital data signal, and means for weightedly summing the products obtained by said first and second means for multiplying.

15. An apparatus for adaptively correcting for distortion of a signal containing digital data and transmitted via a modulation system wherein a portion of said data is transmitted on a first channel and another portion of said data is transmitted on a second channel, said apparatus comprising, in combination:

a first shift register having $n$ cells for storing the most recent $n$ data bits received on said first channel, $n$ being an integer greater than 1, a first signal sample means for sampling the signal transmitted on said first channel and providing an output signal indicative of the sampled signal, $n$ first correlators, each associated with a corresponding cell of said first shift register, each of said first correlators comprising, a first multiplier means for digitally multiplying the output signal of said first signal sample means with the datum contained in said corresponding cell of said first shift register, and means for integrating the output signal of said first multiplier means, a second shift register having $m$ cells for storing the most recently received $m$ data bits received on said second channel, $m$ being an integer greater than 1, a second signal sample means for sampling the signal transmitted on said second channel and providing an output signal indicative of the sampled signal;

$m$ second correlators, each associated with a corresponding cell of said second shift register, each of said second correlators comprising, a second multiplier means for digitally multiplying the output signal of said second signal sample means with the datum contained in said corresponding cell of said second shift register, and means for integrating the output signal from said second multiplier means, $n$ first digital multipliers, each associated with a corresponding one of said first correlators and each comprising means for deriving an output having an amplitude equal to said integrated output signal from said corresponding first correlator and having a sign determined by the datum contained in said corresponding cell of said first shift register, $m$ second digital multipliers, each associated with a corresponding one of said second correlators and each comprising means for deriving an output having an amplitude equal to said integrated output signal from said corresponding second correlator and having a sign determined by the datum contained in said corresponding cell of said second shift register, and means for summing the outputs from each of said first and second digital multipliers to provide a correction signal.

16. The apparatus defined in claim 15 further comprising means for subtracting said correction signal from said signal received from said first channel to derive a corrected received signal.

References Cited

UNITED STATES PATENTS

| 3,237,160 | 2/1966 | Mitchell | 340—146.1 |
|---|---|---|---|
| 3,267,431 | 8/1966 | Greenberg | 340—172.5 |
| 3,368,168 | 2/1968 | Lucky | 333—18 |
| 3,414,819 | 12/1968 | Lucky | 333—18 |

PAUL J. HENON, Primary Examiner

R. F. CHAPURAN, Assistant Examiner

U.S. Cl. X.R.

235—181; 333—18; 340—146.1